United States Patent [19]
Hufton

[11] Patent Number: 5,941,645
[45] Date of Patent: Aug. 24, 1999

[54] BEARING ASSEMBLY

[76] Inventor: Peter F Hufton, 79 Belfield Road, Etwall, Derby, DE65 6JL, United Kingdom

[21] Appl. No.: 08/954,629

[22] Filed: Oct. 20, 1997

[30] Foreign Application Priority Data

Nov. 2, 1996 [GB] United Kingdom ............... 9622876

[51] Int. Cl.⁶ ..................................... F16C 23/04
[52] U.S. Cl. ............................ 384/114; 384/12; 384/905
[58] Field of Search .................. 384/9, 12, 100, 384/103, 114, 272, 273, 278, 905

[56] References Cited

U.S. PATENT DOCUMENTS 3,897,983  8/1975  Hindle ..................................... 384/220
4,502,795  3/1985  Klaass et al. ........................... 384/103
5,059,038  10/1991 Domes .................................. 384/103 X
5,560,714  10/1996 Hufton ................................... 384/114

FOREIGN PATENT DOCUMENTS 0703 374 A2  3/1996  European Pat. Off. .

Primary Examiner—Thomas R. Hannon
Attorney, Agent, or Firm—W. Warren Taltavull

[57] ABSTRACT

A bearing assembly comprises a piston mounted within and capable of reciprocating with respect to a fixed bearing shell. The bearing shell is provided with openings for the supply of a bearing medium, such as compressed air, into a clearance between the piston and the bearing shell. The bearing shell is tapered circumferentially which renders the bearing shell flexible. As the diameter of the piston increases due to thermal expansion, the diameter of the bearing shell changes automatically to maintain the clearance therebetween.

7 Claims, 3 Drawing Sheets

BEARING ASSEMBLY

FIELD OF THE INVENTION

The present invention relates to a bearing assembly of the type where a pressurised flow of fluid is injected between a moveable component and a bearing shell.

BACKGROUND OF THE INVENTION

A problem with this type of bearing is that the clearance between the moveable component, such as a shaft or piston, and the bearing shell has to be small to minimise the flow of fluid and the power consumption. This can be a limiting factor if there is differential expansion between the moveable component and the bearing shell during operation.

EP-A-0703374 discloses a bearing assembly whereby a close clearance is maintained automatically between the moveable component and the bearing shell to compensate for any differential expansion.

In this known bearing arrangement grooves are provided along the length of the bearing shell. The grooves give radial flexibility whilst maintaining the axial stiffness of the bearing shell.

A problem with this known type of bearing is that the bearings are difficult to machine to the accuracy required to give the necessary low fluid consumption.

SUMMARY OF THE INVENTION

The present invention seeks to provide a bearing having a stiffer bearing shell which has a very accurate bore which remains circular and which gives the required low fluid consumption.

According to the present invention a bearing assembly comprises a bearing shell disposed around a component, the component being capable of movement relative to the bearing shell, the bearing shell being provided with a plurality of openings for the supply of a pressurised bearing medium into the bearing shell, the bearing shell is tapered circumferentially to render the bearing shell radially flexible, the bearing shell being caused to conform closely to the component by forces applied across an axial slot in the bearing shell such that in operation in response to changes in the size of the component the dimensions of the bearing shell can be changed automatically to maintain the annular clearance between the bearing shell and the component.

The change in the size of the component may be due to thermal expansion or contraction.

Preferably the axial slot is bound by an axially extending hinge formed either integrally or separately from the bearing shell. Spring loaded bolts may extend through the hinge to apply forces across the axial slot.

An axial seal member may be incorporated adjacent the axial slot to prevent air loss through the hinge.

In a further embodiment of the present invention the clearance between the moveable component and the bearing shell are tapered axially to reduce leakage of the bearing medium therefrom. The clearance may be tapered by applying differential forces across the axial slot in the bearing shell.

BRIEF DESCRIPTION OF THE DRAWINGS

The present invention will now be described with reference to the accompanying drawings in which.

DETAILED DESCRIPTION OF THE INVENTION

Figure 1:
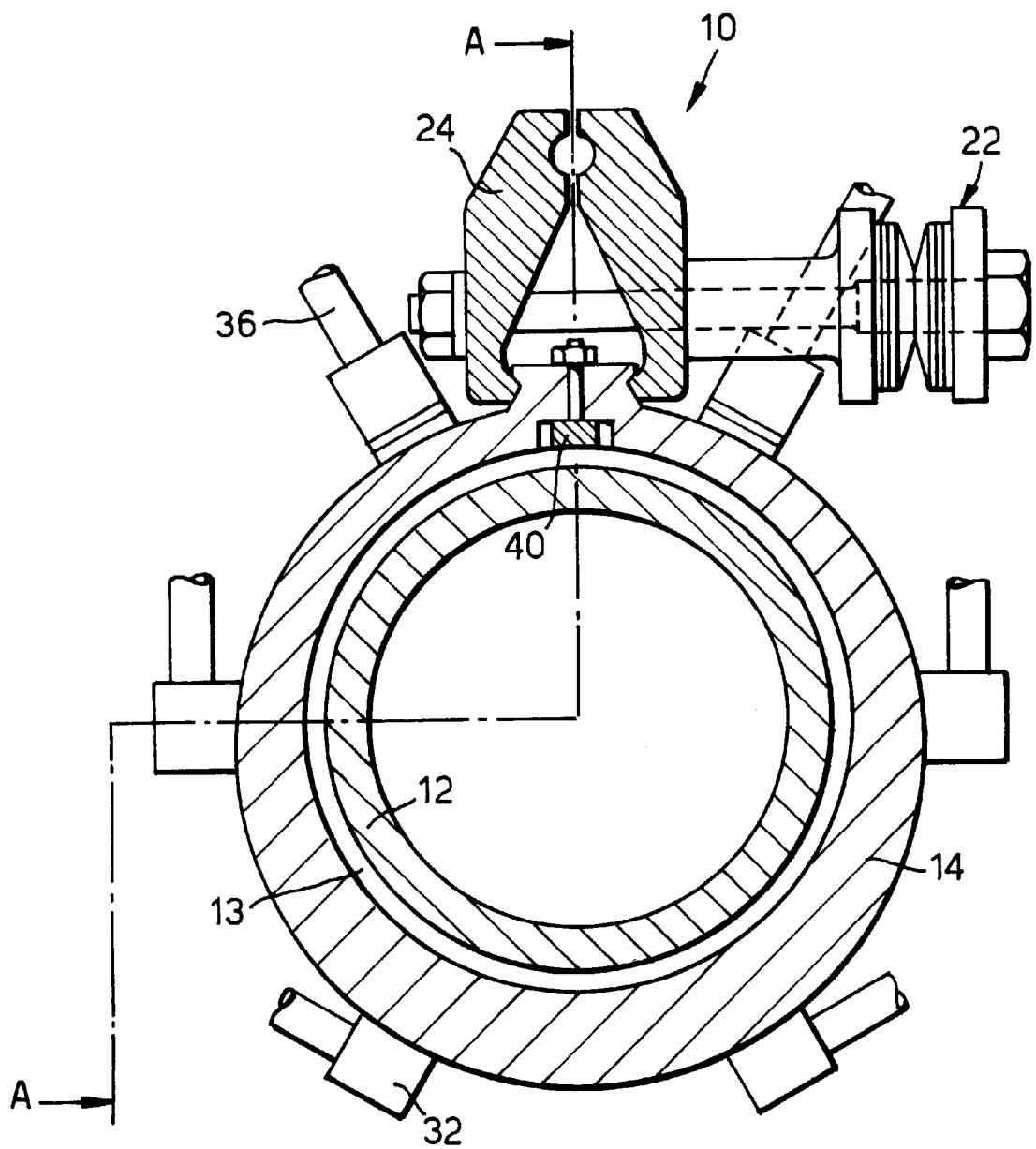
FIG. 1 is a partial cross sectional view of a bearing assembly in accordance with the present invention.
Figure 2:
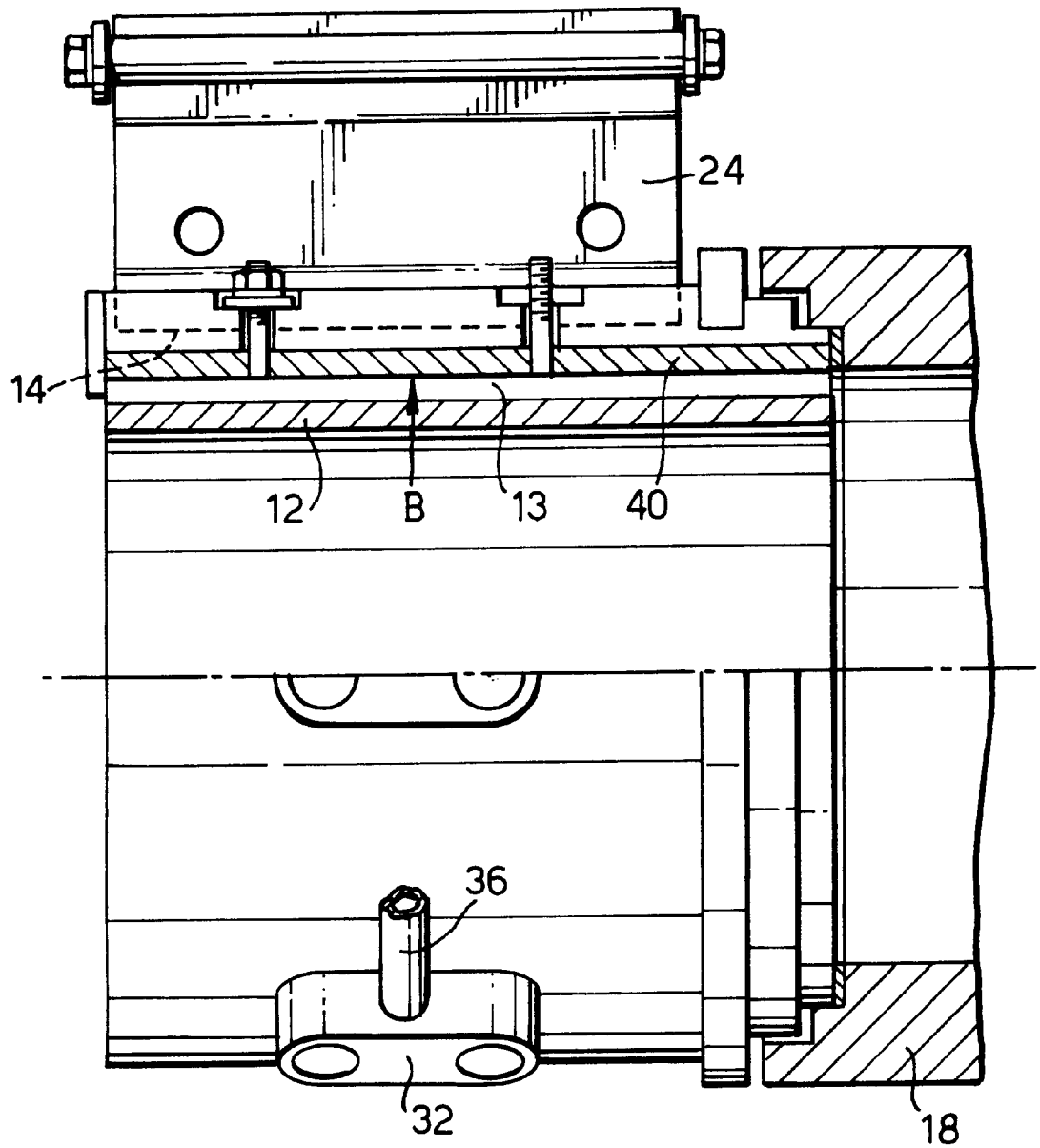
FIG. 2 is a view along line A—A in FIG. 1.

Referring to FIG. 1 a bearing assembly 10 comprises a bearing shell 14 disposed around a piston 12. The piston 12 reciprocates in the bearing shell 14.

Figure 4:
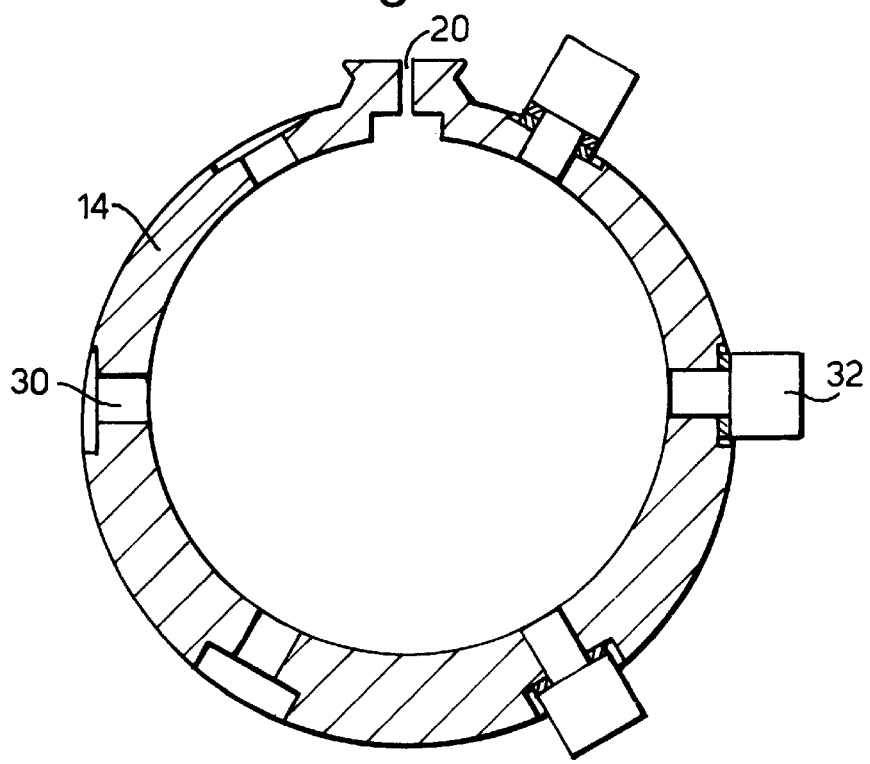
FIG. 4 is a cross-sectional view of a bearing shell in accordance with the present invention.

The bearing shell 14 is located in the engine cylinder housing 18. The bearing shell 14 is tapered in a circumferential direction, FIG. 4. The bearing shell 14 is thin adjacent a slot 20 and increases in thickness towards the opposite side of the bearing shell 14. The diameter of the bearing shell 14 is controlled by changing the width of the slot 20. The width of the slot 20 is controlled by spring loaded bolt assemblies 22 which pass through a hinge plate 24.

Figure 5:
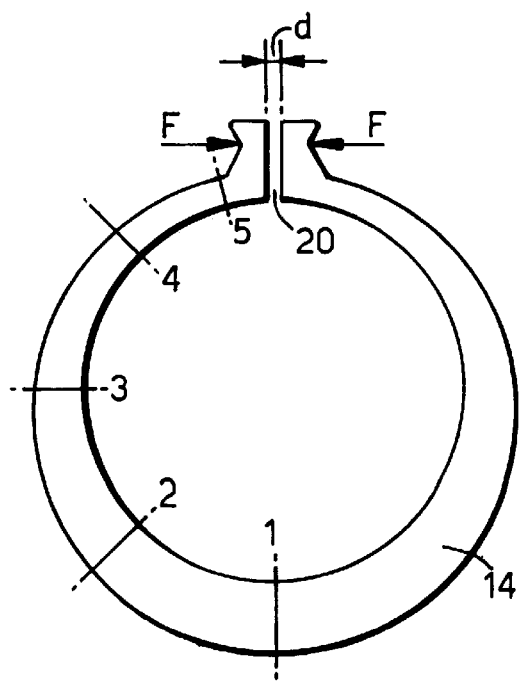
FIG. 5 illustrates the forces applied to a bearing shell in accordance with the present invention.

FIG. 5 shows the clamping forces applied to the bearing shell 14 by the hinge plate 24 and bolt assemblies 22. The bending moment applied by the clamping force to the bearing shell 14 at position 1 is large and reduces through positions 2, 3, 4 and 5 as the moment arm decreases. The bore of the bearing shell 14 must remain circular as the clamping force is applied and the gap d is closed. This is achieved by a progressive change in the cross section of the bearing shell 14.

Figure 6:
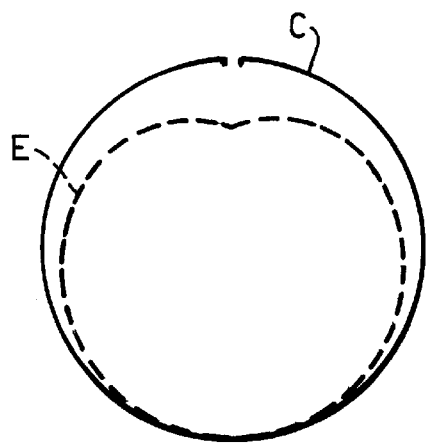
FIG. 6 illustrates the distortion of the bore of a bearing shell if the cross section is kept constant.

FIG. 6 shows a comparison between the required circular bore shape, C, and the distortion of the bore of the bearing shell 14 that occurs if the cross section of the bearing shell 14 is kept constant, E. The radius of curvature is large opposite the slot, and gradually reduces as the moment arm reduces, thus producing the heart shape, E illustrated in FIG. 5.

The bearing shell has six holes 30 into which standpipes 32 are fastened. Each standpipe 32 is coupled to a supply of compressed gas (not shown) via a flexible pipe 36.

In operation with no gas supplied to the standpipe 32 the bearing shell 14 grips the piston 12 under the action of the spring loaded bolt assemblies 22. When gas flows through the standpipes 32 the bearing shell 14 expands keeping its circular shape under the action of the gas pressure until the gas pressure force balances the forces on the spring bolt assemblies 22.

For a given gas pressure the clearance 13 between the bearing shell 14 and the piston 12 can be controlled by adjusting the spring loaded bolt assemblies 22. The clearance 13 is determined by the ratio between the fluid pressure and the bolt spring forces. In operation should the diameter of the piston 12 increase due to thermal expansion, then because the final gas pressure is unchanged the flexible bearing shell automatically increases to maintain a clearance 13.

Figure 3:
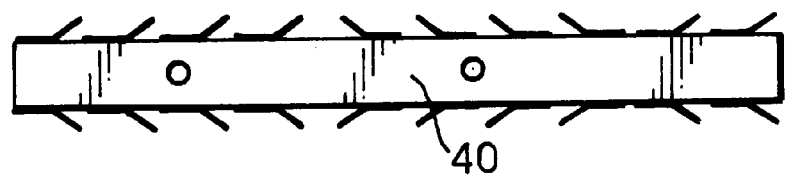
FIG. 3 is a view of a seal element in the direction of arrow B in FIG. 2.

The gas acts as both a lubricant and a seal since the continuous flow of gas into the clearance 13 prevents the ingress of cylinder gases into the bearing assembly 10. To prevent leakage of the gas through the slot 20 a seal 40, shown in FIG. 3, is inserted adjacent the slot 20 in the bearing shell 14.

By setting a varying load on each of the spring loaded bolt assemblies 22 the clearance 13 can be made to taper axially along the length of the piston 12. The tapered clearance 13 creates an asymmetric flow along the length of the piston 12 which can be used to further reduce leakage flow into of from the engine cylinder housing 18.

A bearing assembly in accordance with the present invention can be used with a component 12 capable of reciprocating and/or rotating motion and the principle applies to all bearing mediums, liquid or gaseous.

Although in the preferred embodiment of the present invention the bearing shell 14 is spring loaded by the bolt assemblies 22 it will be appreciated by one skilled in that other means may be used which enable it to automatically adjust to restore the clearance 13 to its original value.

I claim:

1. A bearing assembly comprising a bearing shell disposed around a component, the component being capable of movement relative to the bearing shell, the bearing shell being provided with a plurality of openings for the supply of a pressurised bearing medium into the bearing shell, the bearing shell being tapered circumferentially to render the bearing shell radially flexible, the bearing shell being caused to conform closely to the component by forces applied across an axial slot in the bearing shell such that in operation in response to changes in the size of the component the dimensions of the bearing shell can be changed automatically to maintain the annular clearance between the bearing shell and the component.

2. A bearing assembly as claimed in claim 1 in which the change in the size of the component is due to thermal expansion or contraction.

3. A bearing assembly as claimed in claim 1 in which the axial slot is bound by an axially extending hinge formed integrally with the bearing shell.

4. A bearing assembly as claimed in claim 3 in which spring loaded bolts extend through the hinge to apply a clamping force across the axial slot.

5. A bearing assembly as claimed in claim 1 in which an axial seal is located adjacent the slot in the bearing shell.

6. A bearing assembly as claimed in claim 1 in which the clearance between the moveable component and the bearing shell is tapered axially to reduce leakage of the bearing medium therefrom.

7. A bearing assembly as claimed in claim 6 in which the clearance is tapered by applying differential forces across the axial slot in the bearing shell.

* * * * *